(12) United States Patent
Grgac et al.

(10) Patent No.: US 8,323,444 B2
(45) Date of Patent: Dec. 4, 2012

(54) SYSTEM AND METHOD FOR PLACING A RESISTIVE IMPLANT FOR WELDING ASSEMBLIES OF PLASTIC COMPONENTS

(75) Inventors: Steven Grgac, Mississauga (CA);
Bradford D. Armstrong, Barrie (CA);
Bruce Luckwell, Innisfil (CA)

(73) Assignee: Magna International Inc., Aurora, Ontario (CA)

( * ) Notice: Subject to any disclaimer, the term of this patent is extended or adjusted under 35 U.S.C. 154(b) by 34 days.

(21) Appl. No.: 12/747,244

(22) PCT Filed: Dec. 11, 2008

(86) PCT No.: PCT/CA2008/002140
§ 371 (c)(1),
(2), (4) Date: Sep. 27, 2010

(87) PCT Pub. No.: WO2009/076749
PCT Pub. Date: Jun. 25, 2009

(65) Prior Publication Data
US 2011/0017394 A1    Jan. 27, 2011

(51) Int. Cl.
*B32B 37/00* (2006.01)
(52) U.S. Cl. .............. 156/273.9; 156/359; 156/379.7; 156/579
(58) Field of Classification Search .......... 156/64, 156/272.2, 273.7, 273.9, 324, 359, 379.6, 156/379.7, 555, 579, 580, 583.1
See application file for complete search history.

(56) References Cited

U.S. PATENT DOCUMENTS

| | | | |
|---|---|---|---|
| 2,851,354 A | 9/1958 | Scanlan et al. | |
| 3,002,834 A | 10/1961 | Di Pasquale | |
| 3,383,489 A | 5/1968 | Ciranko | |
| 7,942,991 B1 * | 5/2011 | Loen et al. | 156/64 |
| 2004/0247927 A1 | 12/2004 | Kurz | |
| 2007/0262057 A1 | 11/2007 | Hengel et al. | |

FOREIGN PATENT DOCUMENTS

CA  1325092 E  12/1993

OTHER PUBLICATIONS

Bates et al., "Resistive Implant Welding of Glass Fiber Reinforced Polypropylene Compounds", SAE 2006 World Congress & Exhibition, Apr. 2006, Published by Society of Automotive Engineers, SAE Technical Papers, Document No. 2006-01-0332, *see whole document*.

* cited by examiner

*Primary Examiner* — James Sells
(74) *Attorney, Agent, or Firm* — Warn Partners, P.C.

(57) ABSTRACT

An implant applicator and method for positioning a resistive implant material on a first plastic component to be used to form a resistive implant weld between that first plastic component and a second plastic component. The resistive implant material is heated and pressed into a targeted surface of the first plastic component to tack the resistive implant into place. The second plastic component is positioned over the tacked resistive implant and a weld formed in a known manner. The resistive implant material can be heated for tacking by passing an electric current through it before it is pressed into the first plastic component by a second member or by contacting the resistive implant material against a separately heated surface prior to pressing it into the first plastic component.

20 Claims, 1 Drawing Sheet

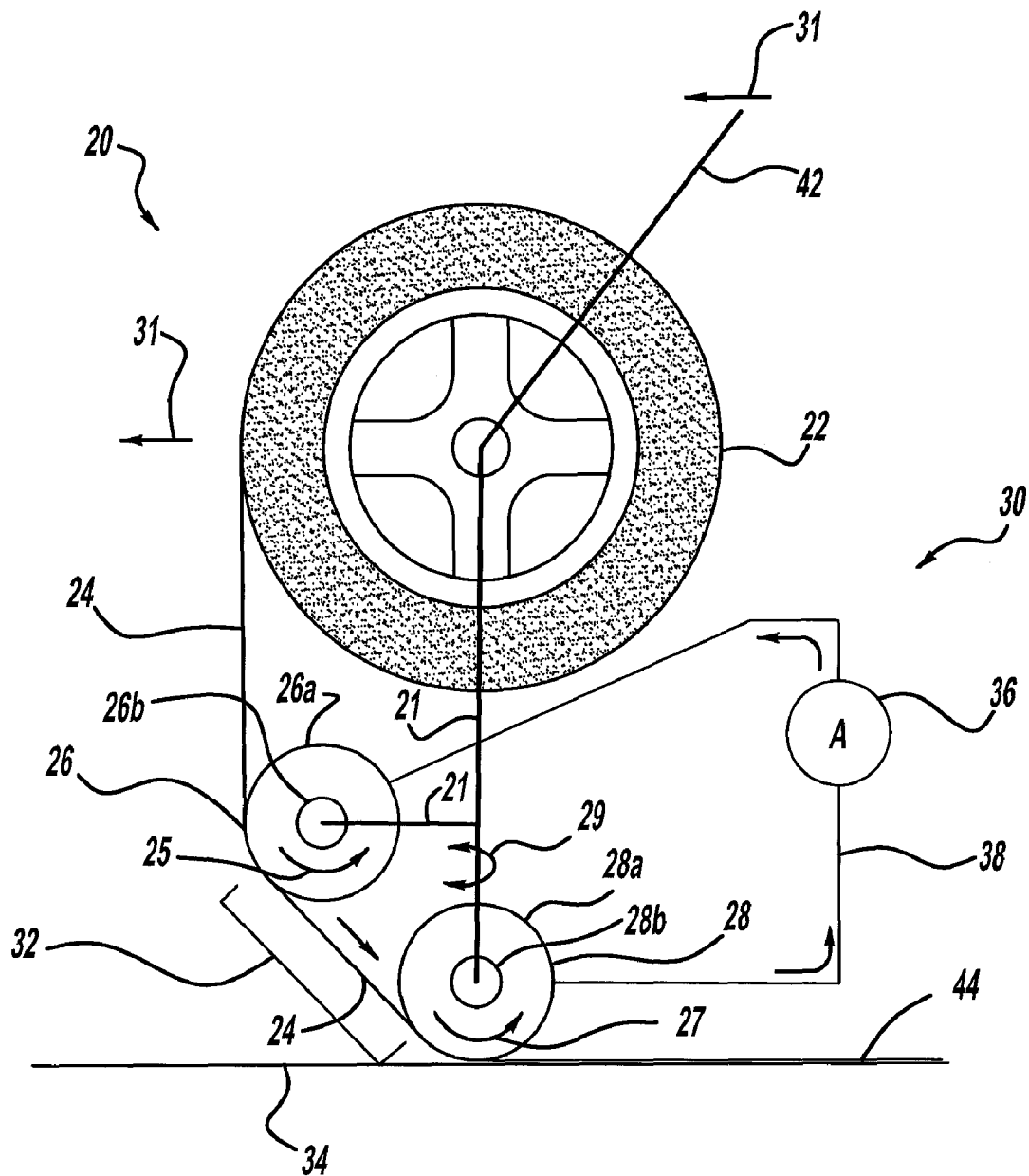

SYSTEM AND METHOD FOR PLACING A RESISTIVE IMPLANT FOR WELDING ASSEMBLIES OF PLASTIC COMPONENTS

FIELD OF THE INVENTION

The present invention relates to resistive implant welding for assemblies of plastic components. More specifically, the present invention relates to an implant applicator and method for placing a resistive implant for welding assemblies of plastic components.

BACKGROUND OF THE INVENTION

A need exists to join thermoplastic components, such as those formed from glass fiber reinforced polypropylene and the like, to other components formed of the same or similar thermoplastic materials. In general, such joining is only achieved via adhesives, mechanical fasteners, laser welding, sonic welding and/or vibration welding, but each of these methods suffers from disadvantages.

One common problem with known methods to join plastic components is that low energy surface adhesives (LESA's) must be employed to adhesively join glass fiber reinforced polypropylene components. LESA's are expensive, typically require long cure times, and can produce undesired fumes while they cure. These factors contribute to high manufacturing costs for assemblies joined by LESA's.

Another common problem with known methods to join plastic components is that the joining of plastic components with mechanical fasteners can result in low strength joints, the mechanical fasteners only connect the components at specific locations, and have high installation labor costs. In addition, such known mechanical fasteners are subject to mechanical failure and can result in failure of the assembly of components.

An additional common problem with known methods to join plastic components is that the laser welding used to join plastic components requires that at least one of the components be at least partially transparent to the laser energy for the process to work. This limits the type of material, finishes, and colors of the components to be joined. In addition, laser welding is a linear process and thus long joints can take significant time to form as the laser must traverse the entire joint length. Additionally, laser welding techniques limit the amount of glass fiber which can be added to the thermoplastic material due to the scattering of the laser energy by the glass fibers. Thus, the mechanical properties of plastic components joined by laser welding can be unduly limited.

Vibration welding can also be employed to join plastic components. A common problem with known vibration welding is that it is limited to making planar joints which do not change profile. Thus, the use of vibration welding is often too limited for many desired assemblies. Sonic welding suffers from similar problems and is typically limited to making relatively short joints and has high associated equipment costs.

Recent interest has developed in joining plastic components, such as glass fiber reinforced polypropylene components and the like, by known resistive implant welding. In general, an electrically conductive implant is positioned between the two components to be joined and pressure is applied to the area of the components contacting the implant. An electrical current is then passed through the implant causing it to heat and melt the material of the components adjacent the implant. The melted portions of the components intermingle under the applied pressure. When the current is removed and the implant and components are cooled, a weld is formed between the components. Cycle times for the welding process of less than one minute can be achieved. While resistive implant welding has offered many advantages over other methods of joining plastic components, it has also suffered from disadvantages in that the placement and retention of the resistive implant between the components to be joined is difficult to achieve and/or labor intensive and has an undesirably long cycle time.

In general, a common method of resistive implant welding is described in, "Resistive Implant Welding of Glass Fiber Reinforced Polypropylene Compounds", by Bates, Tan, Zak and Mah, published by the Society of Automotive Engineers, SAE Technical Papers, document number 2006-01-0332 and the contents of this paper are included herein, in its entirety, by reference. One presently known resistive implant is formed of a stainless steel mesh with wires of 0.009 inches in diameter woven in a plain weave of sixteen wires to an inch. This implant is positioned between the two surfaces of the components to be joined and pressure is applied to the components adjacent the implant. An electrical current is applied to the implant and the current passing through the stainless mesh generates heat which, in combination with the applied pressure, forms a weld between the two surfaces once the current is removed and the weld cools. While this known method can result in good welds between the components, it has proven to be difficult and labor intensive to position the implant in a desired position and to maintain it there during the heating and joining process. This is especially true if the weld is to be formed along join lines with complex geometries that can include curves, profile changes, etc.

Accordingly, there exists a need for an improved implant applicator and method for positioning and tacking a resistive implant for welding assemblies of plastic components which substantially obviates or mitigates these disadvantages and to help render resistive implant welding conducive to mass production techniques having cycle time constraints.

SUMMARY OF THE INVENTION

The present invention is directed to an implant applicator and method for positioning a resistive implant on a first plastic component to be used to form a resistive implant weld between that plastic component and another. The improved implant applicator is used for position and tacking a resistive implant on a first plastic component to be joined to a second plastic component via resistive implant welding. The implant applicator has a supply member of resistive implant material, a first member to assist in guiding the resistive implant material from the supply member, a second member to press resistive implant material from the supply member and first member onto the first plastic component, and a heating arrangement for selectively heating the resistive implant material between the supply member and the second member. When the second member presses the heated resistive implant material onto the first plastic component, the resistive implant material is tacked in place on the first plastic component, thereby forming a resistive implant.

After the resistive implant material is heated and pressed into a surface of one of the plastic components to tack the implant into place, a second component can then be positioned over the tacked resistive implant and a weld formed in a known manner. The resistive implant material can be heated for tacking by passing an electric current through it before it is pressed into the first plastic component, or by contacting the resistive implant material against a separately heated surface prior to pressing it into the plastic component. The resistive implant material can be a conventional resistive implant, e.g., a mesh of stainless steel wires and the like, or any other suitable resistive implant material as will occur to those of skill in the art.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a schematic illustration of an applicator for a resistive implant in accordance with the present invention.

DETAILED DESCRIPTION OF THE PREFERRED EMBODIMENTS

The following description of the preferred embodiment(s) is merely exemplary in nature and is in no way intended to limit the invention, its application, or uses.

Referring to FIG. 1, an implant applicator is generally shown at 20 in accordance with an embodiment of the present invention. The implant applicator 20 has a supply member 22 for supplying a resistive implant material 24, at least one first member 26, at least one second member 28, and an electrical arrangement 30 for heating the resistive implant material 24. The resistive implant material 24 can be wound about the supply member 22, e.g., wound about a reel, spool, and the like, and can be precut to the required length or cut to length as needed during operation. The resistive implant material 24 is electrically conductive and is formed of a stainless steel mesh, e.g., wires woven in a plain weave of sixteen wires per inch, or other resistive implant material suitable to be employed with the present invention.

The first member 26 is spaced apart from the supply member 22 and is formed as an intermediary member to selectively guide the resistive implant material 24 supplied from the supply member 26 to the second member 28, e.g., formed as a roller, a cylindrical-like member, and the like. The first member 26 is at least partly formed of electrically conductive material, e.g., copper, stainless steel, and the like, and has a first outer surface 26a operable for guiding the resistive implant material 24, e.g., formed with a substantially smooth surface. The first member 26 is preferably formed as a roller which can be rotated about its central axis, e.g., counterclockwise, as illustrated by first rotation arrow 25. This helps to keep the resistive implant material 24 generally taunt as the first member 26 guides it toward the second member 28. It is understood that the implant applicator 20 can further include a guide roller associated with the first member 26 to help maintain the resistive implant material 24 in contact with the first member 26.

The second member 28 is spaced apart from the first member 26 generally adjacent to and at least partly below the first member 26. The longitudinal length of the first member 26 and the longitudinal length of the second member 28 are generally aligned such that a longitudinal axis passing through each respective length is substantially parallel. The resistive implant material 24 spans the length 32 between the first member 26 and the second member 28. The second member 28 is formed, e.g., formed as a roller, a cylindrical-like member, and the like, to selectively press the resistive implant material 24 onto a first plastic component 34. The second member 28 is at least partly formed of electrically conductive material, e.g., copper, stainless steel, and the like, and has a second outer surface 28a operable for pressing the resistive implant material 24 into the first plastic component 34, e.g., a substantially smooth surface. The second member 28 is preferably formed as a roller which can be rotated about its central axis, e.g., counterclockwise, as illustrated by second rotation arrow 27. This helps to keep the resistive implant material 24 generally taunt and facilitates the positioning and pressing of the resistive implant material 24 with respect to the first plastic component 34. It is understood that the second outer surface 28a can alternatively have a set of upstanding protrusions, e.g., ribs, bosses, raised profiles, and the like, which engage generally opposing surfaces of the first plastic component 34 to tack the resistive implant material 24 in place. It is further understood that a male profile feature with a unique cross section formed on the first plastic component 34 can help to avoid poor weld conditions. It is further understood that the first plastic component 34 can be molded with upstanding ribs, bosses, protrusions, profiles, or other features which can be melted to assist in tacking the resistive implant material 24 to the first plastic component 34.

The first member 26 and second member 28 are operably connected to an electrical arrangement 30 having an energy source 36, e.g., a battery or other conventional energy source, and an electric circuit 38. Electrical current is selectively applied by the energy source 36 to either the first member 26, second member 28, or alternatively, both the first and second member 26,28 simultaneously. Preferably, the electric current flows through the first member 26 and through the length 32 of the resistive implant material 24 spanning between the first and second members 26,28, which heats this length 32 of the resistive implant material 24. It is understood that additionally a signal from an electronic control unit and the like can act as an on/off switch for allowing the application of voltage and flow of current to the first member 26 and/or the second member 28.

The central portions of the supply member 22, and first and second members 26,28, indicated at 26b and 28b respectively, are rotationally coupled to respective rods 21, e.g., rods, tubes, plates, and the like. The rods 21 are operable coupled to one another to form a substantially rigid system operable for applying pressure between at least the second member 28 and the first plastic component 34 to tack the resistive implant material 24 to the first plastic component 34. It is understood that the implant applicator 20 can additionally have a housing operably formed to substantially encase the supply member 22, resistive implant material 24, first member 26, second member 28 in part, and at least partially the heating arrangement 30 and has the benefit of helping to prevent the egress of debris and dust into the implant applicator 20. In addition, the implant applicator 20 can have one or more additional rods 21 for selectively coupling the components to the housing. It is further understood that the housing is preferably formed as a two piece housing to allow servicing and manipulation of said implant applicator 20 components as well as changing out of said resistive implant material 24 and implant applicator 20 components.

The second member 28 is also operable formed to selectively pivot at least about a longitudinal axis extending generally between the supply member 22 and the second member 28, as shown by pivoting arrow 29, to operably orient, and if necessary, deform the resistive implant material 24 for tacking it to a contour or feature of the first plastic component 34. By way of non-limiting example, second member 28 can be pivoted with respect to the first member 26 such that the resistive implant material 26 is deformed and aligned tangentially to a curve to allow the second member 28 to tack the resistive implant material 24 to the first plastic component 34 about a desired radius and the like if the weld to be formed includes curved portions. The pivotal second member 28 helps to improve accuracy and flexibility of the inventive implant applicator 20. It is understood that edge guides can be connected between the first member 26 and the second member 28 to help center the resistive implant material 24 on the second member 28 even if the second member 28 is pivoted to follow a radius or other desired shape of the first plastic component 34.

In operation, the resistive implant material 24 contacting the second member 28 is placed in contact with the first plastic component 34 and the implant applicator 20 is moved in a generally forward direction, as illustrated by direction arrow 31, adjacent to a targeted surface of the first plastic component 34 which is to be joined to a second plastic component by resistive implant welding. This movement can be performed by a robotic arm, generally indicated schematically at 42, affixed to the implant applicator 20. The movement can alternatively be performed manually by an operator holding a handle and the like affixed to the implant applicator 20. It is understood that a CNC machine and the like can also be used. The energy source 36 applies electric current through the electric circuit 38 to the first member 26 substantially contemporaneously with the generally forward movement of the implant applicator 20. The length 32 of the resistive implant material 24 spanning between the first and second members 26,28 completes the electric circuit 38 therebetween and is heated by the electric current flowing through it. As the implant applicator 20 is moved forward the heated resistive implant material 24 contacting the second member 28 is pressed into the surface of the first plastic component 34 as the second member 28 is moved along the surface, thereby tacking resistive implant material 24 in place creating a resistive implant 44 for joining a second plastic component by a resistive implant weld.

As the second member 28 approaches an edge or end of a targeted surface of the first plastic component 34, or other region where it is desired to not form a weld, the electric current applied between the first member 26 and second member 28 is removed to allow length 32 to cool so that additional resistive implant material 24 is not tacked into place by the second member 28. The resistive implant material 24 can then be cut to the desired length to form a free end. Once the resistive implant 44 is tacked in place, it remains in the required position while the second plastic component is positioned onto the resistive implant 44 on the first plastic component 34. A resistive weld can then be formed in the conventional manner to join the first plastic component 34 second plastic component together. One conventional manner for forming a restrictive implant weld requires electrical current to be applied to the restrictive implant 44 via connections at each end. The restrictive implant 44 can be tacked in place with a free end at each end to allow for the connection of the welding electric current to be passed through the tacked resistive implant 44. In other circumstances, a pair of apertures or voids can be formed in the first plastic component 34 and/or in the second plastic component to be joined to the first plastic component 34 with each end of restrictive implant 44 being tacked in place over a respective aperture. Electrical contacts can be extended through the apertures to contact the restrictive implant 44 and complete the electric circuit to provide the necessary current.

It is understood that the electric current can be applied between supply member 22 and second member 28, or between supply member 22 and first member 26, if desired. In the latter case wherein the electric current is applied between supply member 24 and first member 26, the second member 28 can be fabricated from a non stick, non conductive material, or coated with a non stick, non conductive material such as polytetrafluoroethylene, to help inhibit melted plastic from sticking to second member 28 as it presses the resistive implant material 24 into the surface of the first plastic component 34. While it is presently preferred that the resistive implant material 24 be heated by an electric current applied between two point of the implant applicator 20, such as first member 26 and second member 28, the present invention is not so limited. Specifically, the resistive implant material 24 can be heated as it contacts at least one, or both, of first member 26 and second member 28 which are heated by any other suitable means, including electric heater elements, a steam supply, etc. It is contemplated that such a configuration can provide improved temperature control for the temperature of the resistive implant 44.

As used herein, the term "plastic" is intended to comprise thermoplastic materials in general and such thermoplastic materials can include added materials, such as glass fibers, to alter their mechanical properties. While some of the following discussion makes specific reference to glass fiber reinforced polypropylene plastics, the present invention is not limited to use with this particular reinforced thermoplastic material.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An implant applicator for positioning a resistive implant on a first plastic component to be joined to a second plastic component by a resistive implant weld, said implant applicator comprising:
   a supply member having a resistive implant material wound about said supply member;
   a first member operably connected to said supply member and at least partly formed of an electrically conductive material,
   a second member operably connected to said supply member and said first member and at least partly formed of an electrically conductive material, wherein said first member is formed as a roller operable to guide said resistive implant material from said supply member to said second member, said second member formed as a roller operable to press said resistive implant material from said first member onto said first plastic component; and
   an electrical arrangement to heat said resistive implant material between said supply member and said second member substantially contemporaneously with said second member pressing said resistive implant material into said first plastic component during movement of said implant applicator, such that heated resistive implant material is tacked in place on said first plastic component.

2. The implant applicator of claim 1, wherein said electrical arrangement further comprises a length of said resistive implant material spanning between said first member and said second member to complete an electric circuit therebetween and said resistive implant material is heated by an electric current flowing through said length.

3. The implant applicator of claim 1, wherein said electrical arrangement comprises a flow of electric current through at least a portion of a length of said resistive implant material prior to said second member.

4. The implant applicator of claim 1, wherein said second member selectively pivots with respect to said first member such that said resistive implant material is aligned tangentially to a curve to allow said second member to tack said resistive implant material to said first plastic component about curved portions of said first plastic component.

5. The implant applicator of claim 1, wherein said second member includes upstanding protrusions to engage opposing surfaces of said first plastic component to press said resistive implant material into said first plastic component.

6. The implant applicator of claim 1, wherein said implant applicator is mounted to a robotic arm which moves said implant applicator generally forward relative to said first plastic component.

7. The implant applicator of claim 1, further comprising a handle which an operator can hold to manually operate said implant applicator.

8. The implant applicator of claim 1, wherein said electrical arrangement for heating said resistive implant material comprises at least one of said first member and said second member being heated by a flow of electric current.

9. The implant applicator of claim 1, wherein at least one of said first member and second member is heated with an electric heater.

10. The implant applicator of claim 1, further comprising an electronic control unit to function as an on/off switch for allowing an application of voltage and flow of current to at least one of said first member and said second member.

11. An implant applicator to position a resistive implant on a first plastic component to be joined to a second plastic component by a resistive implant weld, said implant applicator comprising:
a supply member of resistive implant material;
a first member to guide said resistive implant material from said supply member;
a second member to press said resistive implant material from said supply member and first member onto said first plastic component; and
an electrical arrangement to heat said resistive implant material between said supply member and said second member, such that when said second member presses said resistive implant material onto said first plastic component, said resistive implant material is tacked in place on said first plastic component.

12. The implant applicator of claim 11, wherein said electrical arrangement to heat said resistive implant material comprises a flow of electric current through at least a portion of a length of said resistive implant material prior to said second member.

13. The implant applicator of claim 11, wherein an electric current is applied between said first member and said second member to heat said resistive implant material.

14. The implant applicator of claim 11, wherein said first member and said second member are rollers.

15. The implant applicator of claim 11, wherein said second member includes upstanding protrusions to assist in pressing said resistive implant material into said first plastic component.

16. The implant applicator of claim 11, wherein said implant applicator is mounted to a robotic arm which moves said implant applicator generally forward relative to said first plastic component.

17. The implant applicator of claim 11, further comprising a handle which an operator can hold to manually operate said implant applicator.

18. The implant applicator of claim 11, wherein said electrical arrangement for heating said resistive implant material comprises at least one of said first member and said second member being heated by a flow of electric current.

19. The implant applicator of claim 11, wherein said second member selectively pivots with respect to said first member such that said resistive implant material is aligned tangentially to a curve to allow said second member to tack said resistive implant material to said first plastic component about curved portions of said first plastic component.

20. A method of operating an implant applicator to position a resistive implant on a first plastic component to be joined to a second plastic component by a resistive implant weld, said implant applicator comprising:
providing a supply member of resistive implant material;
providing a first member to guide said resistive implant material from said supply member;
providing a second member to press said resistive implant material from said supply member and first member onto said first plastic component, said second member operable to selectively pivot with respect to said first member to operably align with contours of said first plastic component;
providing an electrical arrangement to heat said resistive implant material between said supply member and said second member,
aligning said second member of said implant applicator with a targeted surface of said first plastic member;
applying an electric current to heat said resistive implant material between said supply member and said second member;
moving said implant applicator in a generally forward direction, such that when said second member presses said resistive implant material that is heated into said first plastic component, said resistive implant material is tacked in place on said first plastic component forming a resistive implant;
positioning said second plastic component on said tacked resistive implant;
forming a restrictive implant weld to join said first and second plastic components by passing an electrical current through said restrictive implant.

* * * * *